United States Patent [19]
Stephenson et al.

[11] Patent Number: 5,283,718
[45] Date of Patent: Feb. 1, 1994

[54] FIBER OPTIC ARC LAMP SYSTEM

[75] Inventors: James G. Stephenson, Kalamazoo; William F. Lohness, Jonesville; Jeffrey L. Cornell, Coldwater, all of Mich.

[73] Assignee: Progressive Dynamics, Inc., Marshall, Mich.

[21] Appl. No.: 38,893

[22] Filed: Mar. 29, 1993

Related U.S. Application Data

[62] Division of Ser. No. 753,302, Aug. 30, 1991.

[51] Int. Cl.⁵ ............................ F21V 8/00; F21V 25/00
[52] U.S. Cl. ...................................... 362/32; 362/276; 362/285
[58] Field of Search ................. 362/32, 276, 285, 295, 362/418, 458, 802, 261

[56] References Cited

U.S. PATENT DOCUMENTS

| | | | |
|---|---|---|---|
| 4,356,534 | 10/1982 | Hattori | 362/276 |
| 4,415,952 | 11/1983 | Hattori et al. | 362/276 |
| 4,464,705 | 8/1984 | Horowitz | 362/12 |
| 4,476,519 | 10/1984 | Hayamizu | 362/32 |
| 4,789,989 | 12/1988 | Stern et al. | |
| 4,797,711 | 1/1989 | Sasada et al. | 355/32 |
| 5,053,929 | 10/1991 | Le Gars | 362/32 |
| 5,178,446 | 1/1993 | Gruber | 362/802 |

*Primary Examiner*—Richard R. Cole
*Attorney, Agent, or Firm*—Beaman & Beaman

[57] ABSTRACT

The invention pertains to a fiber optic lamp system such as those employed in medical diagnostic systems using a cabinet containing a power supply having a front extendible drawer containing a 250 watt focused beam metal halide arc lamp mounted in a removable bracket which includes a sensing tab extension. The bracket sensing tab operates an electrical interlock switch when the proper lamp is properly installed. The interlock switch controls power to the system whose circuit includes pin and floating sleeve electrical connectors which automatically directly completes the circuit to the arc lamp upon the drawer being closed. The amount of light transferred to the fiber optic cable is optimized by offsetting the axis of focused light with respect to the optic cable axis at the cable interface.

2 Claims, 3 Drawing Sheets

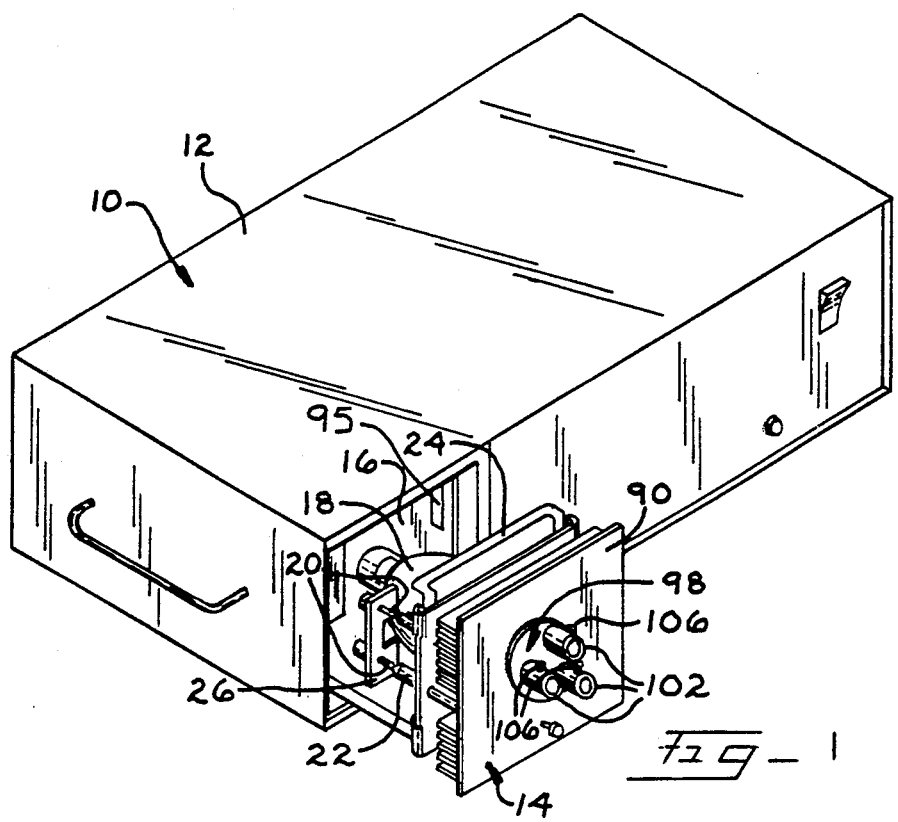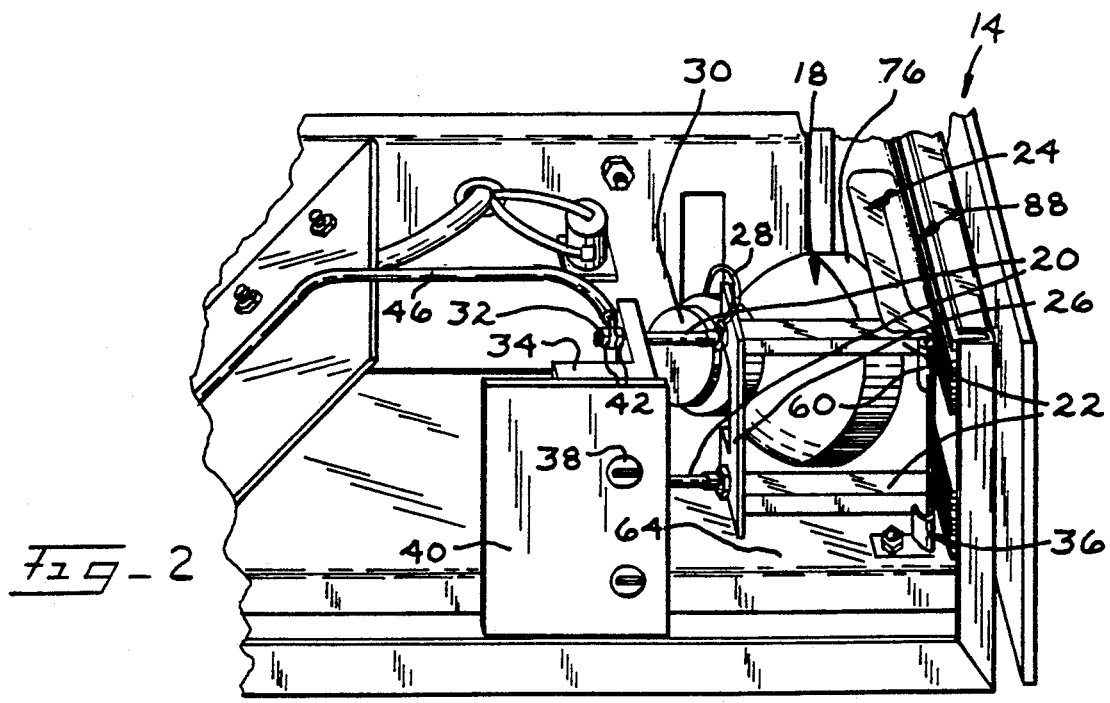

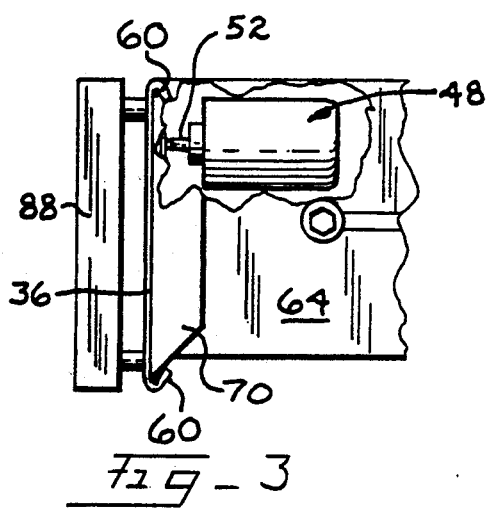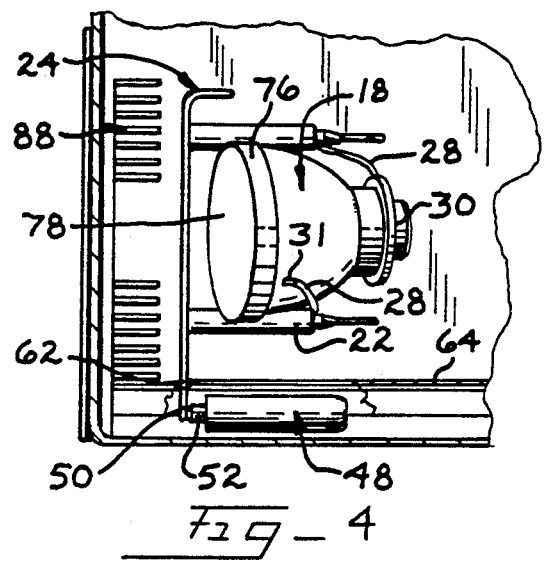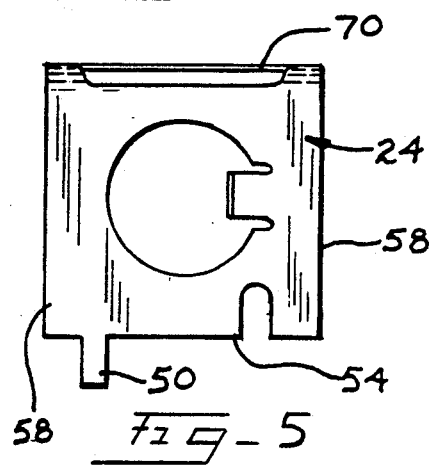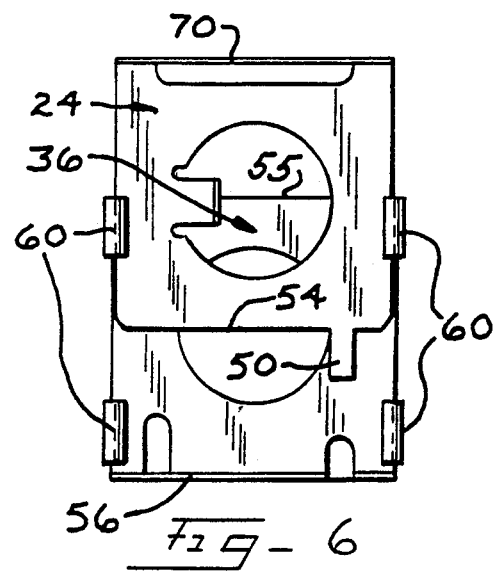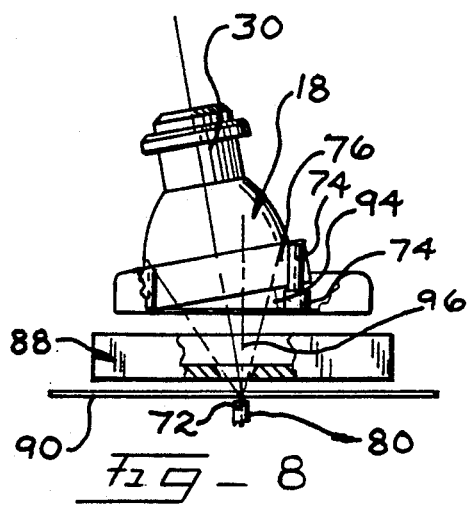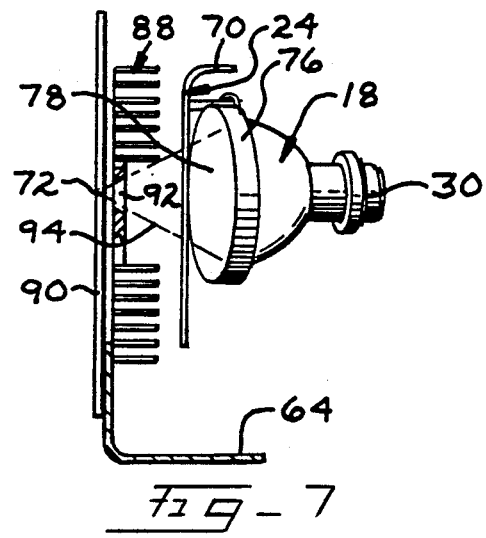

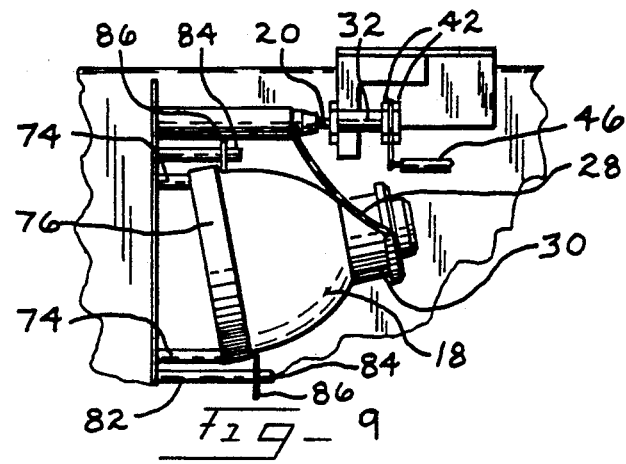
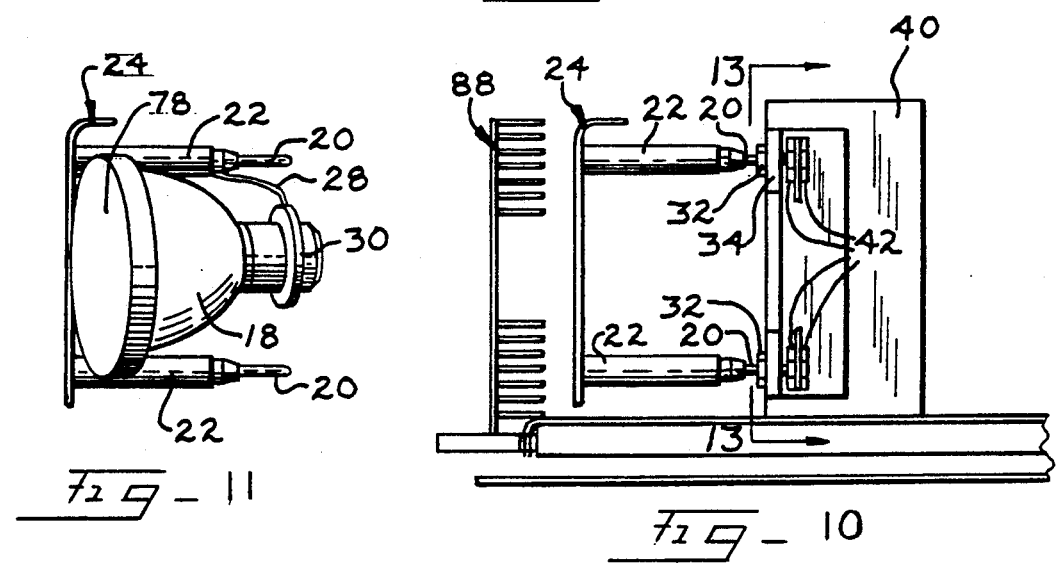
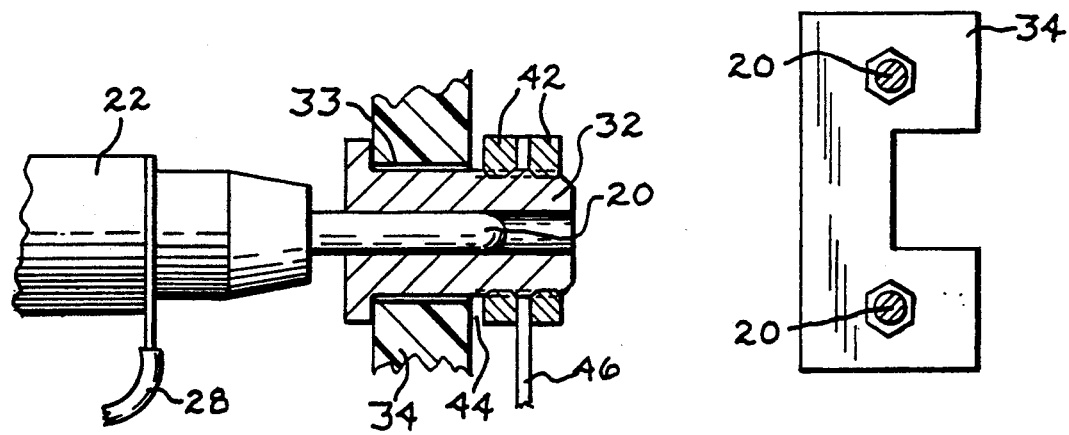

FIBER OPTIC ARC LAMP SYSTEM this is a division of application Ser. No. 07/753,302 filed Aug. 30, 1991.

BACKGROUND OF THE INVENTION

1. Field of the Invention

The present application relates to medical diagnostic apparatus for introducing a high intensity light beam into a fiber optic cable.

2. Description of Related Art

Fiber optic cable illumination apparatus is used for medical diagnostic purposes wherein a focused lamp supplies light to an optic cable interface. Such devices operate most efficiently when the proper lamp is properly focused. However, present units permit improper lamps to be substituted during lamp replacement. Additionally, present illumination apparatus requires manual electrical connections be made during lamp replacement necessitating a higher degree of skill by the operator than is desirable.

Fiber optic systems are known to have inefficient light introduction interfaces due to the spaces between the fibers which contribute little to the interface when the light source impinges directly upon them. Also, due to the contour of the light beam impinging on the flat, planar fiber ends, an effect known as Newtonian ring interference causes rings of color light to appear at the cable output which reduces the illumination quality of the cable bundle. Known illumination apparatus have not effectively overcome this phenomenon.

OBJECTS OF THE INVENTION

In view of the foregoing deficiencies of medical illumination apparatus, it is an object of the invention to provide a more powerful and efficient high intensity light source for the transmission of light by means of fiber-optical cables.

A further object of the invention is to provide an essentially pure white light for fiber-optical cable transmission and to provide a more efficient application of light to a fiber optical cable interface.

Yet another object of the invention is to provide a method of preventing electrical shock to personnel servicing the lamp assembly when the lamp supporting drawer is extended and to insure proper electrical connection to the lamp assembly before energizing the lamp electrical connections.

A further object of the invention is to provide a lamp replacement system for medical diagnostic apparatus which substantially eliminates the likelihood of improper lamps being installed through the use of an electrical interlock which completes the circuit to the lamp only upon the proper lamp being properly positioned with respect to the optical cable interface.

SUMMARY OF THE INVENTION

These objects are accomplished, in part, through the novel use of an internally focused metal halide arc lamp as a light source for medical diagnostic illumination apparatus. The halide arc lamp provides a significantly greater light intensity than a comparable wattage incandescent lamp. Additionally, the halide arc lamp provides light of a multi-color spectra through a differential reflector focusing configuration such that the light quality at the focal beam is adjusted to achieve an exceptionally intense white light which is superior for purpose of illumination in the medical field wherein the light source is distributed through fiber optic cables.

It has been found that among the problems attendant with fiber optic light transmission technology is the inefficient transmission of light into the cables through the fiber optic cable interface and the presence of Newtonian interference rings at the cable output. The invention employs a metal halide arc light having a focused output beam having an axis, the focal point of the beam is directed to impact at the fiber optic cable interface and the beam axis is at an angle of about 10° relative to the cable interface axis. This angle increases the amount of light carried through the cable through enhancement of the acceptance angle of the converging beam to the end of the cable bundle while also minimizing the Newtonian ring interference at the light output.

In order to avoid potential shock hazard, the circuit to the bulb power receptacles located in the housing and the bulb connectors mounted on a slidable drawer supporting the lamp is interrupted when the drawer is opened to expose the lamp for replacement purposes. The electrical circuit to the lamp is automatically restored when the drawer is closed.

Further, the apparatus includes an interlock feature located on a bracket directly attached to the proper lamp and when a proper lamp and bracket are installed, an interlock tab defined on the lamp mounting bracket closes an electrical interlock switch when the bracket is properly positioned which completes the circuit to the bulb power receptacles. This unique tab interlock is such that improper lamps placed within the bracket cannot activate the unit, nor can the electrical interlock switch be inadvertently activated through other means.

BRIEF DESCRIPTION OF THE DRAWINGS

In order that the invention may be clearly understood, it will now be described, by way of example, with reference to the accompanying drawings, wherein:

FIG. 1 is a perspective view of medical diagnostic illumination apparatus in accord with the invention having a lamp supporting drawer partially extended from its cabinet enclosure, FIG. 2 is an enlarged detail cut-away perspective view of the cabinet and drawer as viewed from the drawer outer side, FIG. 3 is an enlarged plan detail cut-away view showing the lamp bracket interlock switch assembly, FIG. 4 is a elevational detail view, partly in cross-section, showing the bracket interlock tab engaging the interlock switch, the insulator columns being omitted for purposes of illustration, FIG. 5 is a front elevational view of the lamp bracket, per se, FIG. 6 is a rear elevational view of the lamp bracket partially inserted into the lamp bracket holder per se, the insulator columns not being illustrated, FIG. 7 is a elevational detail side view, partially in cross-section of the heat sink and lamp assembly, the insulator columns and lamp bracket holder being omitted for purpose of illustration, FIG. 8 is a detail plan view, partially in section, of the drawer face and lamp assembly, the lamp bracket holder being omitted for purpose of clarity, FIG. 9 is a detail plan view of the lamp assembly lamp plugs in engagement with the floating receptacle bracket when the drawer is closed, FIG. 10 is an elevational detail sectional view of the connector system showing lamp plug engagement with the floating receptacle bracket when the drawer is closed, the lamp components and the lamp bracket holder being omitted for purpose of illustration, FIG. 11 is an elevational view of the lamp assembly and bracket, per se, the insulator columns being omitted for purpose of illustration, FIG. 12 is an enlarged detail elevational view of the floating lamp connector, partially in section, and FIG. 13 is an elevational view of the floating receptacle connector member as taken along 13—13 of FIG. 10.

DESCRIPTION OF THE PREFERRED EMBODIMENTS

A medical diagnostic fiber optic light source apparatus for the supplying of light for illumination to a fiber optic cable interface utilizing the invention is generally indicated at 10 of FIG. 1, and the light source apparatus includes a cabinet housing 12 with a slidingly insertable drawer 14 adapted to facilitate component maintenance. Inside the housing 12 is a standard power supply, not shown, which provides electrical power to the drawer circuitry.

When the drawer 14 is extended from the cabinet front opening compartment 16, the resulting exposed, energized electrical surfaces pose an electrical shock hazard which is avoided in the invention by using a separating connector system, as illustrated in FIG. 10, which automatically electrically disconnects an installed 250 watt focused beam metal halide arc lamp 18, as the drawer is withdrawn from the cabinet.

The separating connector system comprises two power connector pins 20 on standoff insulators 22 which horizontally extend from a vertically mounted lamp bracket 24 with a bridging insulative spacing member 26 between them. Electrical connection between the pins 20 and the metal halide arc lamp 18 are made by wires 28 extending from a lamp base connector 30 and a second lamp terminal 31 to solder pads on the spacing member 26 in electrical connection with the power connector pins 20. These rigidly extending pins 20 make connection with two complementary aligned, longitudinally spaced radially floating sleeve connectors 32 mounted upon and through an opposing insulated cabinet mounted receptacle bracket 34 when the lamp bracket 24 is correctly seated in the lamp bracket holder 36 which is fixed to the drawer 14.

The cabinet receptacle bracket 34 is fabricated of a durable insulating material such as nylon secured by screws 38 to a contiguous cabinet mounting plate 40, FIG. 2. While the preferred embodiment employs enlarged sleeve connector mounting holes 33 in the bracket 34 which cooperate with floating sleeves connectors 32 and their associated connector nuts 42 which are secured in a spaced relationship to the bracket 34, it is anticipated that other locations and connector types may be substituted for the configuration of the preferred embodiment without departing from the inventive concepts. The space 44 between the bracket and the floating sleeve connectors allows the sleeve connectors 32 to axially pivot thereby facilitating alignment with the pins 20 which enables the drawer to be closed and the electrical connections made in spite of any relatively minor pin and sleeve connector misalignment which may exist. Electrical connection is made to the sleeve connectors 32 by means of a ring lug connector terminated wire 46 which is secured between the two connector nuts 42 and to which electrical current is supplied by the power supply, not shown.

An interlock switch 48 prevents power supply energization unless the arc lamp bracket 24 is properly in place as is sensed by the cooperation of a lamp bracket interlock tab 50 with the interlock switch plunger 52. The lamp bracket lower edge 54 engages the lamp bracket holder bottom flange 56 when the bracket 24 is fully inserted, as illustrated in FIG. 2. As seen in FIG. 6, the lamp bracket side edges 58 slidingly engage spaced lamp bracket holder guide tabs 60, homogeneously formed of the bracket holder material, thereby assuring proper lamp bracket alignment as the bracket 24 is inserted into the guide tabs 60 for parallel mounting upon holder 36. Should improper bulb installation occur, the power connector pins 20 will not align with and engage the cabinet floating sleeve connectors 32 thereby preventing power from being applied to the lamp 18. Furthermore, the bracket interlock tab 50, an extension of the lamp bracket 24, will ensure that the floating sleeve connectors 32 will be activated only if the lamp 18 is correctly in place prior to closing the lamp drawer 14. The tab construction is such that other bulbs placed within the unit cannot activate the unit, nor can the unit be activated by another means. When the lamp bracket 24 is properly fully seated in the lamp bracket holder 36, the interlock tab 50 extends downward through a drawer interlock hole 62, FIG. 4, which is mounted on the drawer bottom surface 64 adjacent and beneath the lamp bracket holder.

The interlock switch 48 is mounted to the lower surface to the drawer bottom 64 in a longitudinal orientation. The plunger 52 longitudinally extends from the interlock switch 48 to a position beneath the drawer interlock hole 62 and the plunger end is beveled to provide a cam surface engageable by tab 50 which axially displaces the plunger when the lamp bracket 24 is correctly and fully seated. The interlock switch 48 interrupts the electrical power to the cabinet power supply if the arc lamp 18 is not installed or is improperly installed thereby assuring safe operation.

The mounting alignment and location of metal halide lamps is critical for the proper application of highly focused light onto the associated fiber optic bundle. By using an interlock tab 50 in conjunction with the square lamp bracket holder 36 and bracket holder guide tabs 60, the lamp assembly is not only positioned laterally, but is also maintained in the preferred square, vertical position by the engagement of the lamp bracket top flange 70 and the bracket holder top edge 55.

The employment of an internally focused beam high intensity metallic halide arc lamp in accord with the invention provides a white light for illumination which is less prone to affect target color appearance than one of a yellow hue, and to the inventors, knowledge, such lamps have not been used previously with medical diagnostic apparatus. The light output of a metal halide arc lamp is a consequence of the process by which a differential reflector focusing technique is applied to the light of multiple color spectra such that the light quality at the focal beam is adjusted to achieve white light. Furthermore, the lamp provides significantly greater light intensity for a given wattage bulb than that which can be attained with an incandescent lamp.

The invention anticipates that in order to use a metal halide arc lamp a special configuration must be employed in order to provide enhanced performance, acceptable service life and economical construction. One of the critical factors associate with the very high intensity of metal halide lamps is the characteristically great amount of lamp heat generated by the lamp's operation, and specifically present in the light beam at its focal point 72, FIGS. 7 and 8. In order to safely dissipate the arc lamp heat and minimize thermal stresses to the system components, three techniques are used.

First, by employing a member interposed between the arc lamp 18 and bracket 24 which will allow for thermal expansion of the lamp and components coming in contact with it, mechanical stresses to the components can be minimized thereby increasing service life. Such a member's effectiveness in minimizing stresses can be further enhanced if it has good insulative qualities. In the preferred invention, spacers 74 are interposed between an annular circumferential ceramic halide arc lamp collar 76 and the lamp bracket 24. The halide arc lamp collar 76 is interposed adjacent to the lamp face 78 and spaced from the lamp bracket 24 to minimize drawer face heating. The spacers 74 in this configuration serve several purposes: a) they remove the lamp face from the bracket; b) they provide a means of adjustment for lamps having diverse focal points; and c) by using spacers of diverse selected lengths, the focused lamp beam axis and bundle interface angle can be varied to enhance the bundle interface angle of acceptance.

The support of the halide arc lamp on the bracket 24 is completed by fixing the halide lamp intermediate the collar spacers 74 and four washers 86 mounted on spaced standoff insulators 82. Each standoff insulator 82 is mounted upon and extends from the lamp bracket 24 alongside the lamp collar 76 and is secured with a screw 84 to securely clamp the arc lamp 18 into place between a spacer 74 and a washer 86 as can be appreciated by reference to FIG. 9.

Secondly, a vaned heat sink 88 is placed intermediate the lamp bracket holder 36 and the drawer face 90, which has a central aperture 92 for passage of the lamp light beam 94 through the heat sink 88 to the fiber optic bundle interface 80, FIG. 8. Air is constantly forced over the heat sink 88 by a fan within cabinet 12 discharging air through port 95, FIG. 1, thereby keeping drawer face 90 temperatures within an acceptable range.

Thirdly, the drawer face heating due to arc lamp radiation is also minimized by the orientation of the lamp beam axis at an approximately 10° horizontal angle relative to the face plane and bundle central axis 96, as seen in FIG. 8, which allows proper application of the light to the fiber optic interface yet minimizes the heat applied to the forward face of the drawer and the enclosure.

The most important benefit of angling the arc lamp to the optic bundle axis is an increased efficiency of light transferred to the bundle from the beam focal point 72 at the bundle interface 80. In using metal halide arc lamps in conjunction with fiber optic cables, it has been found that by directing the light to the bundle interface at an angle, rather than in alignment with the bundle axis, a more efficient transfer of light results due to enhancement of the acceptance angle of the converging beam to the end of the bundle, consequently, more light is transferred to and carried through the bundle. It has been determined that by deviating the lamp beam axis between 8° and 12° from the optic fiber bundle axis optimum improved results are achieved, and preferably, a 10° angle deviation is employed.

Newtonian ring interference patterns normally occur which degrade the output light quality from fiber optic cables. Newtonian rings are caused by light interference from the contact of the conical light wave's spherical front when it contacts the planar fiber optic fiber interface. The invention's significant advancement to the art of angling the arc lamp as previously described improves the quality of light at the bundle output by the minimization of Newtonian ring interference patterns.

A turret assembly 98 is located on the drawer face 90 which is rotatable and selectively aligns the fiber optic interface of one of several sizes of fiber optic cables with the aperture 92, the appropriate size of cable may be inserted in the correspondingly sized connection sleeve 102. The cables are secured by set screws 106 installed on each of the several turret connection sleeves 102.

It is appreciated that various modifications to the inventive concepts may be apparent to those skilled in the art without departing from the spirit and scope of the invention.

We claim:

1. Fiber optic medical diagnostic light source apparatus supplying light to a fiber optic cable interface which is attached to a cabinet having a lamp power supply and a lamp circuit comprising in combination, a lamp bracket holder mounted on the cabinet, a lamp bracket movably supported on said lamp bracket holder, interlock switch operating means defined on said lamp bracket, a focused lamp mounted on said lamp bracket having a beam adapted to be received by the cable interface at a predetermined position of said lamp bracket, and an electric interlock switch controlling energizing of the lamp circuit adapted to be operated by said lamp bracket switch operating means at said predetermined position of said lamp bracket.

2. In fiber optic medical diagnostic light source apparatus as in claim 1, said interlock switch operating means comprising a tab defined on said lamp bracket, an axially displaceable plunger operating said interlock switch, said plunger being displaced by said tab upon said lamp bracket being moved t said predetermined position.

* * * * *